Figure 1:
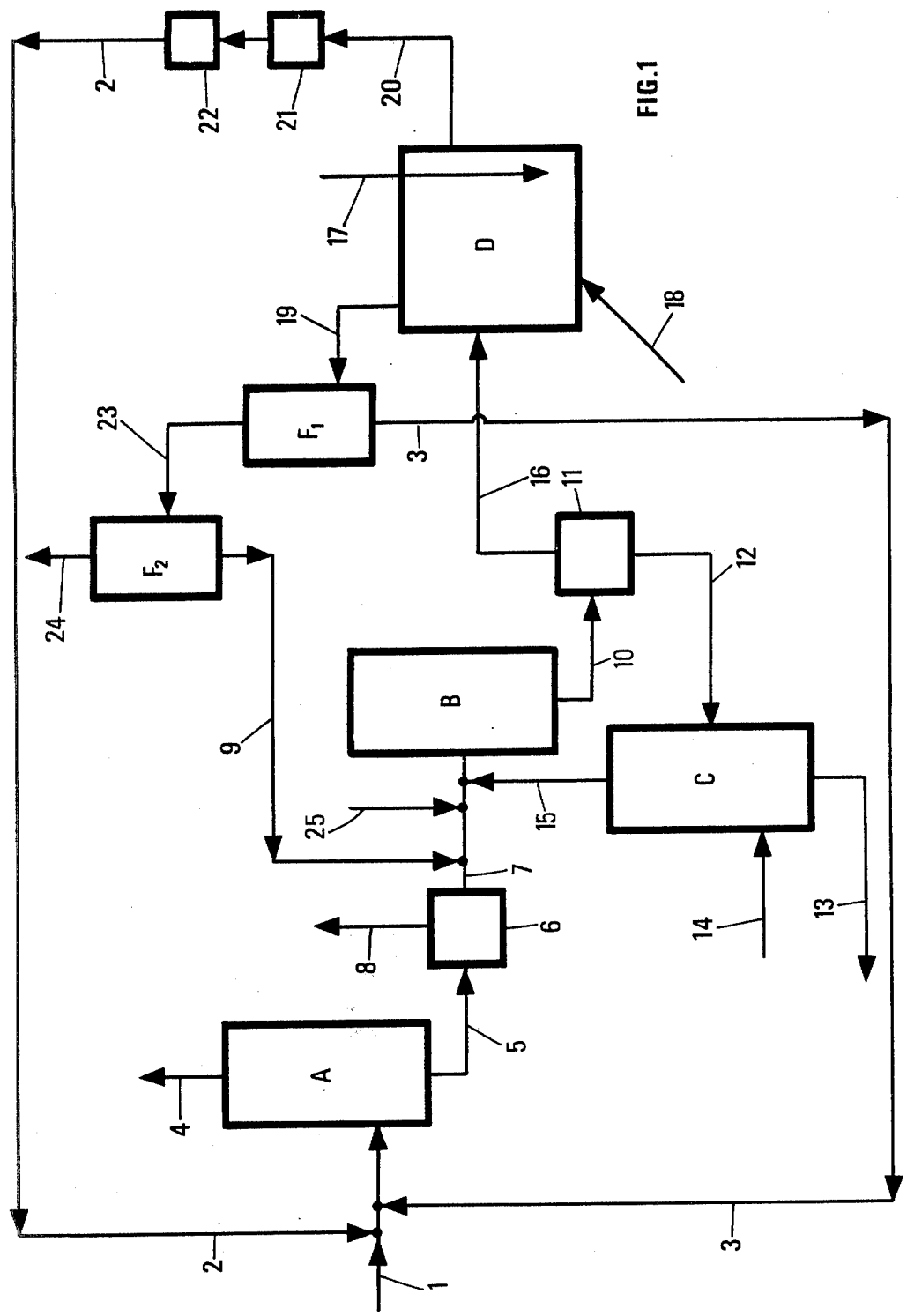

United States Patent [19]

Dezael et al.

[11] 4,164,543
[45] Aug. 14, 1979

[54] PROCESS FOR REGENERATING BRINES CONTAINING SODIUM SULFITES AND SULFATES

[75] Inventors: Claude Dezael, Maisons Laffitte; André Deschamps, Noisy le Roi; Sigismond Franckowiak, Rueil Malmaison, all of France

[73] Assignee: Institut Francais du Petrole, Rueil-Malmaison, France

[21] Appl. No.: 865,287

[22] Filed: Dec. 28, 1977

[30] Foreign Application Priority Data

Dec. 28, 1976 [FR] France ................................. 76 39519

[51] Int. Cl.$^2$ ............................................. C01D 7/00
[52] U.S. Cl. ..................................... 423/189; 423/242; 423/541 A
[58] Field of Search ............... 423/242 A, 541 A, 356, 423/547; 423/189

[56] References Cited

U.S. PATENT DOCUMENTS

| | | | |
|---|---|---|---|
| 3,676,059 | 7/1972 | Welty, Jr. ............................. | 423/242 |
| 3,761,575 | 9/1973 | Furkert ............................. | 423/541 A |
| 3,846,535 | 11/1974 | Fonseca ............................. | 423/242 |
| 3,966,891 | 6/1976 | Renault et al. ....................... | 423/242 |

*Primary Examiner*—O. R. Vertiz
*Assistant Examiner*—Wayne A. Langel
*Attorney, Agent, or Firm*—Millen & White

[57] ABSTRACT

Process for regenerating brines containing simultaneously sodium sulfites and sulfates so as to produce sulfur dioxide and an alkaline solution usable for absorbing sulfur dioxide, comprising contacting the brine with ammonium bisulfate, sodium bisulfate and ammonium sulfite to produce sulfur dioxide and an enriched solution of sodium sulfate and ammonium sulfate, which is reacted with $CO_2$ and ammonia to obtain solid sodium bicarbonate which is decomposed to form $CO_2$ and an enriched solution of ammonium sulfate, containing dissolved ammonium bicarbonate, which is heated with a reducing agent so as to decompose the ammonium sulfate to ammonia and ammonium bisulfate which is partly reduced to gaseous ammonia and sulfur dioxide, said process including several recycling steps.

12 Claims, 2 Drawing Figures

PROCESS FOR REGENERATING BRINES CONTAINING SODIUM SULFITES AND SULFATES

This invention concerns a process for converting brines containing sodium sulfites and sulfates.

Brines of this type are for example those resulting from the washing of sulfur oxides containing fumes with solutions of sodium hydroxide, sodium sulfite or sodium carbonate, whereby higher purification rates are achieved for the fumes than when using ammonia solutions which, moreover, are difficult to regenerate.

Certain brines produced in the chemical industry, for example waste effluents from plants making use of sulfuric acid, may be regenerated by this way.

All these solutions may contain, according to their origin, in addition to sodium sulfites and sulfates, other salts such as sodium thiosulfates, thionates and/or polythionates without impeding the performance of the invention. They will be destroyed in a known manner in a step of the process.

The invention makes use of a technique consisting of converting sodium sulfites and sulfates to sodium bicarbonate which can be easily converted to sodium carbonate or sulfite, which can be directly used as absorbing agents, e.g. for absorbing sulfur oxides.

The proposed process provides for the regeneration of brines containing one or more sodium salts of oxygenated sulfur acids by recovering, on the one hand, substantially all sulfur contained therein as sulfur dioxide and, on the other hand, sodium in the form of sodium carbonate or sulfite which may be reused.

The process comprises the following successive steps:

(a) contacting the brine with ammonium bisulfate, sodium bisulfate and at least one ammonium sulfite whose origin is indicated hereinafter, so as to produce gaseous sulfur dioxide and a solution enriched with sodium sulfate and ammonium sulfate, (b) reacting the solution obtained in step (a) with carbon dioxide and ammonia whose origin is indicated hereinafter, so as to obtain sodium bicarbonate in a solid state and a solution enriched with ammonium sulfate and containing dissolved ammonium bicarbonate, and separating the sodium bicarbonate in a solid state from said solution, (c) decomposing the sodium bicarbonate in a solid state to form carbon dioxide, (d) heating the resulting solution of step (b) with an amount of reducing agent lower than the stoichiometrical one with respect to the reaction of sulfate reduction, so as to decompose the ammonium sulfate to ammonia and ammonium bisulfate and to reduce a portion of the latter to ammonia and sulfur dioxide, thereby obtaining, on the one hand, a gas containing sulfur dioxide, ammonia and water and, on the other hand, ammonium bisulfate and sodium bisulfate, (e) separating the gas obtained from step (d) and cooling it to a temperature $t_1$ while forming a first condensate, then to a temperature $t_2$ below $t_1$ while forming a second condensate, (f) feeding the first condensate to step (a) to produce ammonium sulfite and the second condensate to step (b) to produce ammonia, (g) feeding to step (a) the ammonium bisulfate and the sodium bisulfate obtained from step (d), and (h) feeding to step (b) the carbon dioxide obtained from step (c).

Step (d) may be performed in two successive stages:

($d_1$) heating, under moderate temperature, the solution obtained from step (b) to decompose the ammonium carbonate contained therein to carbon dioxide and ammonia which is fed back to step (b) thereby obtaining a solution having a lower content of ammonium salts.

($d_2$) reacting, at a relatively high temperature, the solution obtained from step ($d_1$) with a reducing agent, so as to obtain an evolution of gaseous sulfur dioxide, ammonia and water which is fed back, after condensation, to step (a), and a mixture of ammonium bisulfate and sodium bisulfate which is recycled to step (a).

Step (c) may be performed in several manners, for example by:

($c_1$) heating the sodium bicarbonate to obtain sodium carbonate, usable as agent for absorbing sulfur oxides, and evolved carbon dioxide which can be fed back to step (b), or ($c_2$) heating the sodium bicarbonate with a solution of sodium sulfites and sulfates, particularly with a portion of the brine to be regenerated, so as to obtain an evolution of gaseous carbon dioxide which is fed back to step (b) and a solution containing sodium sulfite, usable as agent for absorbing sulfur oxides.

The brines to be treated are aqueous solutions containing salts, mainly sodium sulfites and sulfates, generally at a concentration of 0.5 to 7 moles per liter and more usually from 3 to 4 moles per liter. They are contacted with aqueous solutions of ammonium and sodium bisulfates and ammonium sulfites issued from subsequent steps of the process.

The step (a) is conducted, for example, under atmospheric pressure, at a temperature from about 20° C. to 120° C. and preferably close to 110° C.

The pH of the reaction medium is maintained at a value from 1 to 7, preferably from 3 to 6, in order to obtain an efficient decomposition of the different sulfites to $SO_2$, according to the following main reactions:

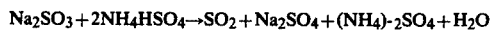

$$Na_2SO_3 + 2NH_4HSO_4 \rightarrow SO_2 + Na_2SO_4 + (NH_4)_2SO_4 + H_2O$$

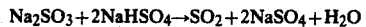

$$Na_2SO_3 + 2NaHSO_4 \rightarrow SO_2 + 2NaSO_4 + H_2O$$

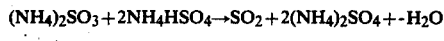

$$(NH_4)_2SO_3 + 2NH_4HSO_4 \rightarrow SO_2 + 2(NH_4)_2SO_4 + H_2O$$

and

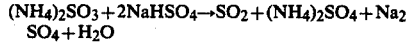

$$(NH_4)_2SO_3 + 2NaHSO_4 \rightarrow SO_2 + (NH_4)_2SO_4 + Na_2SO_4 + H_2O$$

and similar reactions when the sulfites are present as bisulfites.

There is preferably used a total amount of sodium bisulfate and ammonium bisulfate corresponding to the evolution of all the $SO_2$ combined in the sulfites, or a slight excess. As far as the amount of the ammonium sulfite is concerned, it corresponds preferably to 1.5 times the amount of sodium sulfate present in the brine although these values are not limitative.

The recovered solution contains the formed sodium and ammonium sulfates as well as the other salts present in the sulfitic brine, such as sodium and ammonium sulfates and, in some cases, thiosulfates, thionates and polythionates which will be decomposed at a later stage.

During step (b), the sodium salts, particularly the sodium sulfate contained in the solution from step (a)

are converted to sodium bicarbonate, which precipitates by contact with an aqueous solution (preferably saturated) of ammonium bicarbonate or with a gaseous mixture of $CO_2$, $NH_3$ and $H_2O$, preferably in excess with respect to the stoichiometrical amount corresponding to the formation of sodium bicarbonate.

For a more efficient conversion, it is advantageous that the solution from step (a) be at a sufficient concentration, i.e. have a salt content close to the saturation i.e. at least 32 g. per 100 g. of solution. Accordingly, it is preferred to concentrate the solution by passing the same, while heating it, through an evaporator. The reaction:

$$Na_2SO_4 + 2CO_2 + 2NH_3 \rightarrow 2NaHCO_3 + (NH_4)_2SO_4$$

is conducted at a relatively low temperature, for example from 20° C. to 80° C., peferably from 20° C. to 40° C. The pressure may be atmospheric or superatmospheric, for example up to 20 atmospheres, and it is usually from 10 to 20 atmospheres.

After having filtered and centrifuged the solution from this step, the sodium bicarbonate precipitate may be heated, in step (c), in a reactor brought to a temperature from 50° to 350° C., preferably close to 150° C. The resulting sodium carbonate may be used, for example, to form absorbing solutions usable for purifying fumes containing sulfur oxides.

In an alternative embodiment, step (c) consists of contacting the sodium bicarbonate precipitate with a portion of the brine to be regenerated so as to obtain sodium in the form of sodium sulfite.

The reaction which takes place:

$$NaHCO_3 + NaHSO_3 \rightarrow Na_2SO_3 + CO_2 + H_2O$$

results in an evolution of $CO_2$ which is fed back to step (b).

The temperature in said step (of the alternative embodiment) is usually of about 40° C. to about 120° C. and, preferbly, it is close to 80° C. The pressure is either atmospheric or superatmospheric e.g. from 1 to 4 atmospheres.

The solution recovered after step (b) has a smaller content of sodium salts. In addition to the preexisting salts and the ammonium sulfate formed during the reaction, it further contains residual ammonium bicarbonate.

This solution may be fed back to the reactor for decomposing sulfates of step (d).

If so desired, it is possible to proceed to a preheating of this solution at a temperature from 80° to 130° C. under a pressure of, for example, from 0.5 to 5 atmospheres, generally from 1 to 2 atmospheres, to produce the following reaction:

$$NH_4HCO_3 \rightarrow CO_2 + NH_3 + H_2O$$

This is the optional step ($d_1$).

The resulting gaseous effluent is used, preferably after having been cooled to a relatively low temperature, close for example to 30° to 40° C., to form a portion of the precipitation agent of step (b).

The residual solution is impoverished in ammonium salts.

During step (d) itself, as defined, (or ($d_2$) when ($d_1$) exists), this solution is heated to 150°–450° C. or more for converting the sodium and ammonium sulfates to the corresponding bisulfates. There is introduced a reducing agent such, for example, as sulfur, hydrogen sulfide, sodium thiosulfate, ammonium thiosulfate or carbon, in a limited amount so as to decompose a fraction of said bisulfates or of the other salts involved, to $SO_2$, $NH_3$ and $H_2O$. Preferably that fraction of the sulfates and/or other salts, which corresponds to the initial amount of $SO_3$ introduced in the brine in the form of sulfate, is decomposed.

During this operation, the sodium and ammonium salts which have not yet been converted are decomposed or reduced and the gas effluent from the reactor consists of sulfur dioxide, ammonia, water and, in some cases, carbon dioxide, when the solution issued from step (b) has been directly treated without the preliminary step ($d_1$).

This gas is cooled, for condensing it, before being recycled to step (a) in the form of ammonium sulfite, then, optionally, a second time at a lower temperature when it contains carbon dioxide, in order to feed it back to step (b) in the form of ammonium carbonate or ammonia whose formation corresponds to an excess of $NH_3$.

In the reaction vessel, the following reactions occur:

$$(NH_4)_2SO_4 \rightarrow NH_4HSO_4 + NH_3$$

$$Na_2SO_4 + (NH_4)_2SO_4 \rightarrow 2NaHSO_4 + 2NH_3 + H_2O$$

as well as reduction reactions, for example:

$$2NH_4HSO_4 + S \rightarrow 3SO_2 + 2NH_3 + 2H_2O$$

There is recovered, at the outlet from the reactor, sodium bisulfate and ammonium bisulfate which, after dissolution in water for their conveyance, followed with a cooling thereof, are used for acidifying the brine in step (a).

Another alternative embodiment of step (d) or step ($d_2$) consists of heating the solution to 150°–450° C. or more without addition of reducing agent, so that $NH_3$ and substantially no $SO_2$ evolve, and passing the resulting liquid or a portion thereof to another reaction zone where the reducing agent is introduced, so as to obtain a distinct stream of $SO_2 + NH_3$.

The water amount circulating through the installation may be kept constant, when necessary, by controlling the amount of water recovered at the outlet from the evaporator used before step (b) and the amount of water added to the recycled bisulfates.

Figure 2:
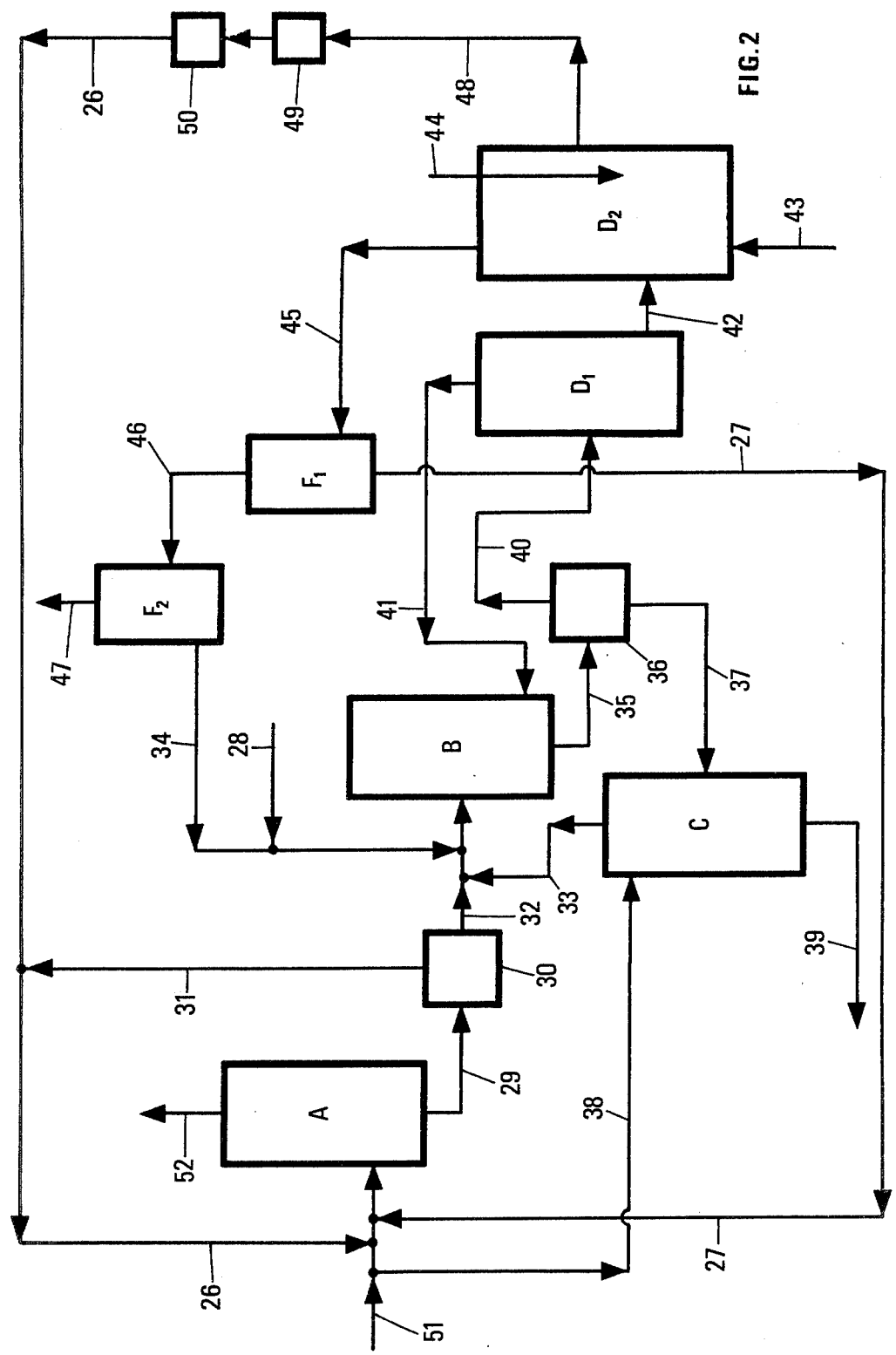

FIGS. 1 and 2 of the drawings are flow sheets illustrative of Examples 1 and 2 respectively.

The following examples illustrate the invention without however limiting the scope thereof.

The mentioned amounts of constituents of the effluents correspond to a one hour feeding rate. On the figures, pumps used in the installation are not shown.

example 1

(FIG. 1)

Brine resulting from the absorption, for example by an aqueous solution of sodium carbonate, of the sulfur oxides contained in a fume and containing:

1 kmole of $Na_2SO_3$, and
0.2 kmole of $Na_2SO_4$ is introduced through line 1 into reactor A for the sulfites acidification and, simultaneously, through line 2, is introduced an aqueous solution containing:

1.3 kmole of $NH_4HSO_4$
1.3 kmole of $NaHSO_4$
and, through line 3, an aqueous solution containing 0.3 kmole of $(NH_4)_2SO_3$, issued from later stages.

The temperature in reactor A is maintained at about 110° C.

The produced vapor, evolving through line 4, contains 1.3 kmole of $SO_2$ and water and may be later used outside of the unit, for example to manufacture $H_2SO_4$.

At the bottom of the reactor, there is recovered, through line 5, a liquid effluent containing:
 1.85 kmole of $Na_2SO_4$
 0.95 kmole of $(NH_4)_2SO_4$
which is passed through an evaporator 6 before being introduced into reactor B, through line 7. Water is reinjected into the unit through line 8.

Reactor B is fed simultaneously, through line 9, with an aqueous stream providing 1.5 kmole of $(NH_4)_2CO_3$ and 0.9 kmole of $HONH_4$ and with a gaseous stream, through line 15, providing 2.4 kmoles of $CO_2$. The reaction medium is maintained at about 35° C. under a pressure of 15 atmospheres.

When starting the unit, $NH_3$ is supplied for example through line 25. The reaction product recovered through line 10 is a solution containing:
 0.65 kmole of $Na_2SO_4$
 2.15 kmoles of $(NH_4)_2SO_4$
 1.5 kmole of $NH_4HCO_3$ and
 2.4 kmoles of $NaHCO_3$ in a solid state;
this solution is filtered in 11, after cooling thereof.

The resulting $NaHCO_3$ precipitate is fed, through line 12, to a reactor C, where it is heated to 150° C. so as to decompose it.

There is recovered, through line 13, from the bottom of the reactor, 1.2 kmole of $Na_2CO_3$ which is recycled as absorbing agent to the fume washing unit. 1.2 kmole of $CO_2$ is introduced through line 14, so that the total amount of $CO_2$ in duct 15 is 2.4 kmoles.

After filtration, the residual solution is fed, through line 16, to a reactor D wherein a temperature of about 350° C. is maintained by means of an immersed burner 17 fed with methane and air. The reduction of the salts is obtained through the addition of 0.1 kmole of sulfur from line 18.

Gas evolves through line 19; it contains decomposition products ($SO_2$, $NH_3$, $H_2O$, $CO_2$) as well as gas issued from the burner. From the reactor there is obtained, through line 20:
 1.3 kmole of ammonium bisulfate
 1.3 kmole of sodium bisulfate.
This product is admixed with water in 21 and cooled in 22 before being recycled, through line 2, to reactor A.

The gases discharged from reactor D, through line 19, are cooled to about 75° C., by passing them through condenser $F_1$. There is thus obtained an aqueous solution containing 0.3 kmole of $(NH_4)_2SO_3$, which feeds reactor A through line 3, and a gas, discharged through line 23, which is cooled again, to about 30° C., by passing it through condenser $F_2$. An aqueous solution is formed, which contains 1.5 kmole of $(NH_4)_2CO_3$ and 0.9 kmole of $HONH_4$ which, through line 9, feeds reactor B.

The inert gases produced during the combustion in burner 17, evolve from the unit through line 24.

EXAMPLE 2
(FIG. 2)

Brine resulting from the washing of fumes with a solution of sodium sulfite contains:
 4.4 kmoles of $NaHSO_3$, and
 0.44 kmole of $Na_2SO_4$.

A portion of this brine providing 2 kmoles of $NaHSO_3$ and 0.2 kmole of $Na_2SO_4$, is introduced into the acidification reactor A, through line 51, together with an aqueous solution providing 1.3 kmole of $NaHSO_4$ and 1.3 kmole of $NH_4HSO_4$ fed through line 26 and an aqueous solution providing 0.3 kmole of $(NH_4)_2SO_3$ fed through line 27, issued from later stages.

The temperature is maintained at about 110° C. The reaction results in the evolution of a gas containing 2.3 kmoles of $SO_2$, which escapes through line 52, and the remaining aqueous solution, recovered through line 29, contains:
 1.85 kmole of $Na_2SO_4$ and
 0.95 kmole of $(NH_4)_2SO_4$ This solution passes through an evaporator 30 for being concentrated. Water is recovered through line 31 and reintroduced into the unit, for example through line 26. The concentrated solution is introduced through line 32, into a reactor B which is simultaneously fed with a gaseous stream, conveyed through line 33, which provides 2.4 kmoles of $CO_2$, and an aqueous solution providing:
 1.5 kmole of $(NH_4)_2CO_3$ and
 0.9 kmole of $HONH_4$
fed through line 34, both of them being recycle decomposition products produced in later stages. Reactor B is also fed with $CO_2$ and $NH_3$ from line 41 as explained hereinafter.

Reactor B is operated under a pressure of 15 atmospheres, at a temperature of 35° C.

When starting the unit, additional $NH_3$ is introduced through line 28.

In these conditions, there is recovered, through line 35, a solution providing:
 0.65 kmole of $Na_2SO_4$
 2.15 kmoles of $(NH_4)_2SO_4$
 1.5 kmole of $NH_4HCO_3$ and
 2.4 kmoles of $NaHCO_3$ in the solid state,
said solution being filtered in 36 after cooling thereof.

The $NaHCO_3$ precipitate is fed through line 37 to a reactor C where it is heated to 80° C. in the presence of the remainder of the brine produced in the fume washing stage and a portion of which has been introduced into reactor A. The amount fed through line 38 corresponds to a feeding rate of 2.4 kmoles of $NaHCO_3$ and 0.24 kmole of $Na_2SO_4$.

There is thus obtained an evolved gas stream containing 2.4 kmoles of $CO_2$, feeding reactor B through line 33, and a solution containing 2.4 kmoles of $Na_2SO_3$ and 0.24 kmole of $Na_2SO_4$, which is recycled through line 39 to the fume washing stage, as washing solution.

The solution obtained in 36, after filtration of $NaHCO_3$, and containing:
 0.65 kmole of $Na_2SO_4$
 2.15 kmoles of $(NH_4)_2SO_4$ and
 1.5 kmole of $NH_4HCO_3$
is introduced, through line 40, into a reactor $D_1$ where it is heated to a temperature of 110° C. under a pressure of 2 atmospheres. $NH_4HCO_3$ is thus decomposed and there is recovered:

1.5 kmole of $CO_2$ and
1.5 kmole of $NH_3$ which are fed back through line 41, to reactor B.

The solution discharged from line 42 is introduced into reactor $D_2$ of sulfate decomposition, which is also fed with 0.1 kmole of sulfur from line 43. In this reactor, the temperature is maintained at about 350° C., by means of an immersed burner fed with methane and air (line 44).

Through line 45, a gas effluent evolves, which contains:

3 kmoles of $NH_3$
0.3 kmole of $SO_2$, said effluent being condensed in condenser $F_1$, at about 75° C., to obtain a solution containing 0.3 kmole of $(NH_4)_2SO_3$, which is fed back to reactor A through line 27. The gas discharged from $F_1$ through line 46 is cooled again in condenser $F_2$, down to a temperature of about 35° C., to condense ammonia contained therein so as to obtain a solution containing 2.4 kmoles of $HONH_4$ which is used to feed reactor B through line 34.

The combustion gas issued from the burner is discharged from the installation through line 47.

From reactor $D_2$ there is obtained, through line 48, a product containing:

1.3 kmole of $NaHSO_4$ and
1.3 kmole of $NH_4HSO_4$ said product being admixed with water in 49 and cooled in 50 before being fed back through line 26 to reactor A.

What we claim is:

1. A process for treating brine containing simultaneously sodium sulfate and at least one of sodium sulfite and sodium bisulfite so as to obtain sulfur dioxide, said process comprising the steps of
   (a) contacting the brine with ammonium bisulfate, sodium bisulfate and at least one of ammonium sulfite and ammonium bisulfite to produce gaseous sulfur dioxide and an enriched solution of sodium sulfate and ammonium sulfate, and separating said gaseous sulfur dioxide from said enriched solution,
   (b) reacting the solution from step (a) with carbon dioxide from step (h) and ammonia from step (f) so as to obtain sodium bicarbonate in a solid state and a solution enriched with ammonium sulfate and containing dissolved ammonium bicarbonate, and residual sodium sulfate, and separating the sodium bicarbonate in the solid state from said solution,
   (c) decomposing a bicarbonate from step (b) to form carbon dioxide,
   (d) heating the solution from step (b) at 150°–450° C. with an agent for reducing ammonium bisulfate and sodium bisulfate to sulfur dioxide, said agent being in insufficient amounts to convert all of said ammonium bisulfate and sodium bisulfate to sulfur dioxide, and recovering a mixture of unconverted ammonium bisulfate and sodium bisulfate, and a gas comprising sulfur dioxide, ammonia and water,
   (e) separating the gas recovered from step (d) and subjecting said gas to stepwise cooling to recover a first condensate comprising an aqueous ammonium sulfite solution and then a second condensate comprising an aqueous ammonia solution,
   (f) feeding the first condensate to step (a) to supply an ammonium sulfite, and the second condensate to step (b) to supply ammonia,
   (g) feeding step (a) with ammonium bisulfate and sodium bisulfate recovered from step (d),
   (h) feeding step (b) with carbon dioxide recovered from step (c), and
   (i) discharging gaseous sulfur dioxide from step (a).

2. A process according to claim 1, wherein the brine contains sodium bisulfite and step (c) consists of heating sodium bicarbonate obtained from step (b) with a portion of the brine to be regenerated so as to obtain a gaseous effluent containing carbon dioxide and an aqueous solution of sodium sulfite and feeding back the gaseous effluent to step (b).

3. A process according to claim 2, wherein said heating is conducted at a temperature from 40° C. to 120° C. and under a pressure from 1 to 4 atmospheres.

4. A process according to claim 1, wherein step (d) is conducted in two stages: ($d_1$) heating to a sufficent temperature the solution obtained from step (b) to decompose the ammonium carbonate contained therein and obtain a gaseous effluent containing carbon dioxide and ammonia and a solution of lower content of ammonium salts, and feeding back the gaseous effluent to step (b) and ($d_2$) contacting said solution of lower content of ammonium salts under higher temperature, with a reducing agent, to obtain a gaseous effluent containing sulfur dioxide, ammonia and water and a mixture of ammonium bisulfate and sodium bisulfate, and feeding back to step (a) said gaseous effluent as ammonium sulfite and said mixture of ammonium bisulfate and sodium bisulfate.

5. A process according to claim 4, wherein step ($d_1$) is conducted at 80°–130° C., under a pressure of 0.5 to 5 atmospheres, and step ($d_2$) at 150°–450° C.

6. A process according to claim 1 wherein, in step (a), the amount of ammonium sulfite is substantially equal to 1.5 time in moles the amount of sodium sultate and the total amount of ammonium bisulfate and sodium bisulfate is substantially equal to that required for liberating all the sulfur dioxide from the sodium sulfite and the ammonium sulfite.

7. A process according to claim 1, wherein step (c) consists of heating the sodium bicarbonate obtained from step (b) for decomposing it to carbon dioxide and sodium carbonate.

8. A process according to claim 1, wherein step (a) is conducted at a temperature from 20° C. to 120° C.

9. A process according to claim 1, wherein step (b) is conducted at a temperature from 20° C. to 80° C.

10. A process according to claim 1, wherein step (b) is conducted at a pressure from 1 to 20 atmospheres.

11. A process according to claim 1, wherein the sodium bicarbonate is decomposed in step (c) at a temperature from 50° to 350° C.

12. A process according to claim 1, wherein step (d) is conducted in two stages: a first stage of heating the solution to 150°–450° C. in the absence of reducing agent, so as to obtain the evolution of a gas of relatively high ammonia content, and then a second stage of heating the solution to 150°–450° C. in the presence of a reducing agent so as to obtain an evolved gas containing simultaneously ammonia and sulfur dioxide.

* * * * *